United States Patent

Dill

[15] 3,658,232
[45] Apr. 25, 1972

[54] AUTOMATIC WELDING MACHINE
[72] Inventor: James M. Dill, La Porte, Ind.
[73] Assignee: The New York Blower Company
[22] Filed: July 30, 1970
[21] Appl. No.: 59,642

[52] U.S. Cl. ................228/48, 29/484, 219/124, 228/7, 228/32
[51] Int. Cl. .........................................B23k 37/04
[58] Field of Search...................228/5, 7, 32, 45, 47, 48; 219/124, 125; 29/484, 493

[56] References Cited

UNITED STATES PATENTS 3,543,989  12/1970  Cooper..............................228/45 X
3,349,983  10/1967  Huff..................................228/7
3,132,617  5/1964  Miller et al. ........................228/7

Primary Examiner—John F. Campbell
Assistant Examiner—R. J. Craig
Attorney—Snow and Benno

[57] ABSTRACT

The disclosure concerns automatic welding machines and is directed to the improvement of certain drive and guide means for a relatively freely carried welding head for continuous welding of a part resting on a freely rotatable table. The drive and guide means are carried on the welding head and impart drive to the part while maintaining the welding head properly positioned relative to the part.

9 Claims, 7 Drawing Figures

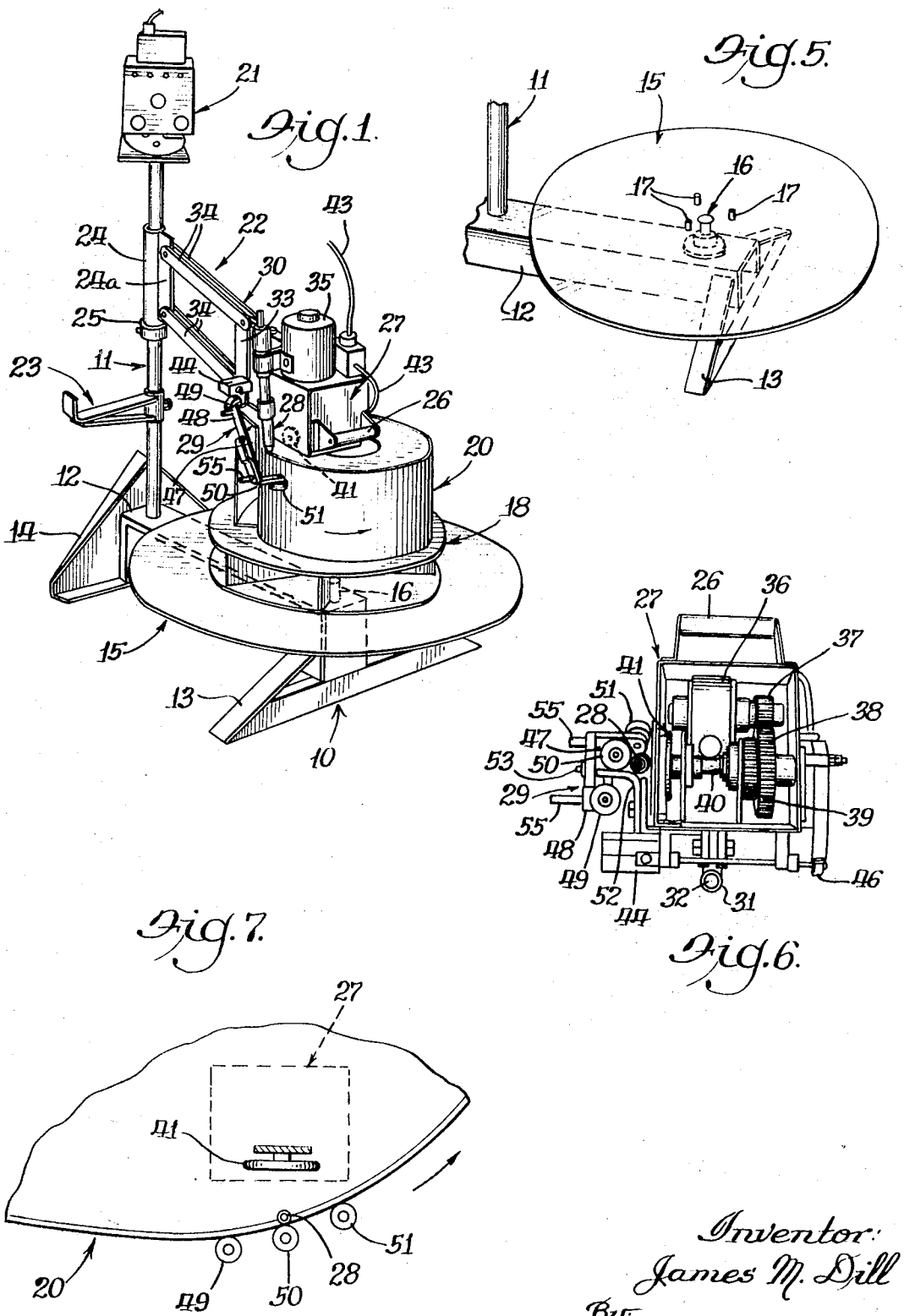

PATENTED APR 25 1972 3,658,232

Inventor:
James M. Dill
By:
Snow and Bruno
Attys.

AUTOMATIC WELDING MACHINE

BACKGROUND OF THE INVENTION

1. Field of the Invention

The purpose of this automatic welding machine is to have a welding gun automatically follow the exterior contour of a fan housing configuration and hold the point of welding of the welding gun in a position for continuous welding in close tolerances to the surface being welded.

2. Description of the Prior Art

Automatic and partially automatic welders to weld parts of varying contours have been disclosed in the following prior patents, but all of them employ a template or tracing type of device for following contours.

| | |
|---|---|
| Garrison | 2,645,475 |
| Osterman et al. | 2,717,569 |
| Downing | 2,726,615 |
| Miller et al. | 3,132,617 |
| Huff | 3,349,983 |

These template following disclosures distinguish from applicant's device which relies on a combination of cams and a drive wheel to hold a welding head to the part to be welded.

SUMMARY OF THE INVENTION

The primary object of the present invention is to provide a simple and efficient arrangement for an automatic welding machine in which the part to be welded is merely placed upon a freely rotatable table and the welding head is then manually moved from a holding pad to rest upon the part to be welded at the starting position of the seam weld with the seam weld then being automatically produced.

An important feature of the invention is the unique drive and guide means which is carried on the welding head and which has a number of functions producing the desired objects of the invention. One function of the drive and guide means is to support the welding head on the part to be welded. Another function is to rotate the part to be welded beneath the welding head. A further function is to hold or guide the welding head in proper welding position to the part to be welded so that the welding head will automatically follow the contour of the part.

Because of the arrangement of the elements of the invention no hold down clamps of any type are required.

The basic elements of the invention are a supporting frame, a welding head carried on the supporting frame for free movement in any direction except tilting from its vertical axis, and a part supporting table carried on the supporting frame for free rotation about a vertical axis. A further basic element is the drive and guide means which is carried on and forms a part of the welding head. The drive and guide means comprises a drive wheel and an arrangement of cam followers. To practice the subject invention it is necessary that the part to be seam welded have an upper surface on which the drive wheel can rest and a generally vertical side edge surface against which the cam followers can ride. Because the present embodiment of the invention is adapted for seam welding fan blower housings, the cam followers comprise an arrangement of a first cam follower which remains in a spaced relationship to the welding head and a pair of cam followers carried on an arm or bracket which is pivotally supported from the welding head. In the alternative one or the other of the pair of cam followers is pivotally positioned to cooperate with the first cam follower to guide the welding head to follow the contour of the upper side surface or wall of the part to be welded. This arrangement of the pair of cam followers permits starting of the seam weld in a corner of the part to be welded, and ending the weld in a corner when the other side of the part is welded.

The drive wheel extends below the welding head and supports the welding head upon the upper surface of the part to be welded. Power means in the welding head operates the drive wheel which rotates the part to be welded relative to the welding head.

The pivotal arm or bracket carrying the cam followers is so formed that a plane including the axis of either of the pair of cam followers, when in part engaging position, is disposed at an acute angle to the plane of the drive wheel with the apex of the angle pointing in the general direction of rotation of the part. This arrangement through the rotational force of the drive wheel on the part provides an effective force acting in a direction inward from the edge of the part to tend to move the welding head inward of the edge of the part and thereby maintain the welding head in a properly spaced and guided condition to follow the contour of the part as the part is rotated.

Other objects and features of the invention will become apparent from the following specification and accompanying drawings.

IN THE DRAWINGS

FIG. 1 is a perspective view of one embodiment of the invention.

FIG. 5 is a view of the table portion of the structure of FIG. 1.

FIG. 6 is a bottom view of the welding head such as shown in FIG. 3.

FIG. 7 is a diagrammatic view of the cooperating arrangement between the part engaging elements of the welding head.

AS SHOWN IN THE DRAWINGS

Figure 3:
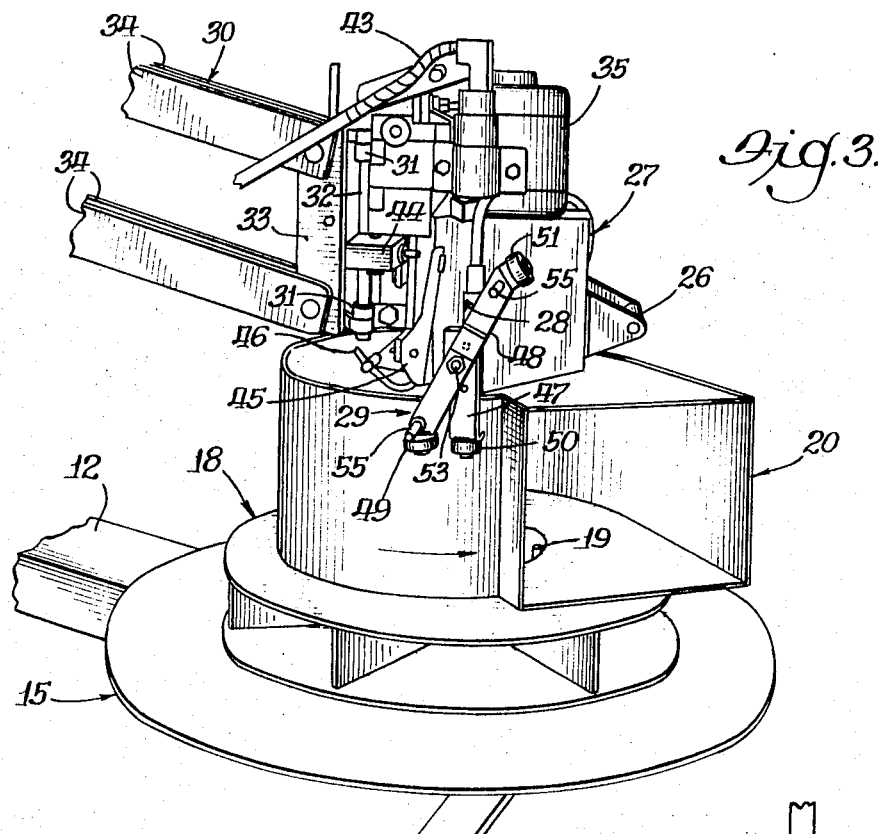
FIG. 3 is a view similar to FIG. 2 but with a part and structure positioned for welding on the opposite side of the part.

In the present embodiment of the invention the supporting structure or frame comprises a base member 10 and a supporting column or post 11. The base member 10 consists of a horizontal beam 12, a front leg assembly 13, and a rear leg assembly 14.

A freely rotatable table 15 is carried on the forward end of the beam 12 through a bearing assembly 16. The upper surface of the table carries three spaced apart locating pins 17 which cooperate with a suitable opening in the part to be welded to generally align the part on the table. In the alternative and to place the part to be welded at a more convenient height to a person operating the welder, a spacer member 18 may be provided. Pins similar to pins 17, one of which is shown at 19 in FIG. 3, are then provided on the upper surface of the spacer member 18.

Figure 2:
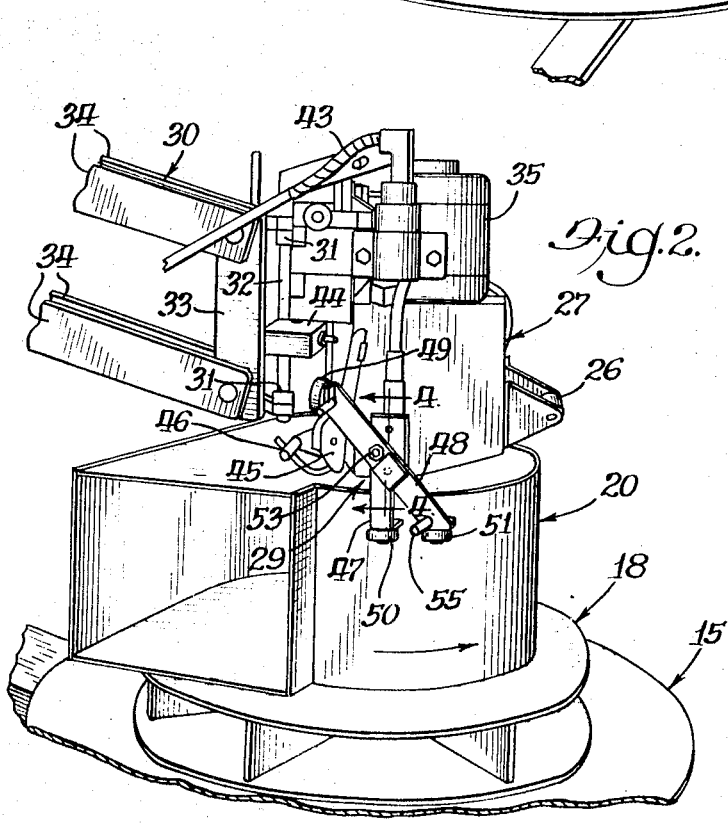
FIG. 2 is an enlarged view of a portion of the structure shown in FIG. 1.

A sample part to be welded is shown at 20 in FIGS. 1, 2, and 3. In FIGS. 1 and 2 one side of the part 20 is positioned for welding, and in FIG. 3 the part 20 has been turned over for welding of the other side. The subject invention is particularly convenient for the welding of well known blower housings for squirrel cage type fans and such a housing is represented in part 20. In that representation part 20 consists of two flat sides interconnected by a curved wall. The three sections of the part are tack welded together preliminary to being seam welded by the subject invention.

The column 11 carries a controller 21, the welding head assembly 22, and a holding pad 23. The controller 21 is mounted on top of the column 11 and may be any well known type for controlling the operation of the welding head assembly 22. The welding head assembly 22 is supported on the column 11 through a sleeve 24 which may be freely rotated about the column 11. The vertical position of the sleeve 24 is determined by a collar 25 which may be adjustably secured at any selected position vertically of the column 11.

The holding pad 23 is also adjustably secured to the column 11 and provides a convenient support for the welding head assembly 22 when it is disengaged from part 20. The operator of the welding machine moves the welding head assembly 22 between part 20 and pad 23 by grasping the handle 26 on the welding head assembly 22 and moving the assembly 22 by rotation of the sleeve 24 on the column 11.

The sleeve 24 is provided with a radially extending flange 24a for carrying the other members of the welding head assembly 22. The other members of the welding head assembly 22 comprise a drive assembly 27, a welding gun 28, a cam follower assembly 29 and a parallelogram linkage assembly 30.

The rearward side of the drive assembly 27 is provided with a pair of vertically spaced apart pin supports 31. The pin supports 31 carry a hinge pin 32 which in turn carries a hinge bracket 33 for pivotal movement about the axis of the pin 32. Two pairs of arms 34 are pivotally connected between the hinge bracket 33 and the flange 24a on the sleeve 24 in a parallelogram pattern. The arms 34 have a length sufficient to carry the drive assembly 27 substantially centrally of the table 15. From the foregoing it may be seen that the drive assembly 27 may be freely raised or lowered, pivoted about the axis of the column 11, and further pivoted about the axis of the pin 32. The assembly 27 can not be tilted from its vertical axis.

A drive motor 35 is mounted on top of the housing of the drive assembly 27 and its shaft extends downwardly into the housing to drive a worm and gear set assembly 36 which may be seen in FIG. 6. A further speed reduction is achieved through a small gear 37 keyed to the output shaft of the worm and gear set assembly 36. A compound gear set 38 meshes with gear 37 and with gear 39 to drive gear 39. Gear 39 is keyed on one end of a shaft 40 which is supported in bearings carried by the housing of assembly 27. Drive wheel 41 is keyed on the other end of shaft 40 and the lower edge of drive wheel 41 extends below the bottom edge of the housing of assembly 27. The periphery of wheel 41 is provided with any suitable material permitting the rotation of wheel 41 to impart frictional drive to the part 20 when the assembly 27 is lowered to rest the wheel 41 on the upper surface of part 20.

The welding gun 28 of the welding head assembly 22 is secured to the side of the drive assembly 27 to extend downwardly of the lower edge of assembly 27 and in proper adjusted position from the upper surface of part 20 to strike a suitable welding arc to the surface of part 20. Any known adjustable clamping means for the gun 28 to the assembly 27 may be used. The gun 28 is also positioned so that the tip is substantially in a vertical plane including the axis of the drive wheel 41.

Other known parts and control elements for the gun 28 may be carried on and form parts of the welding head assembly 22. Such parts and elements are shown merely by way of example and may comprise cables 43, switch 44, switch operator 45 and ground contactor 46.

Figure 4:
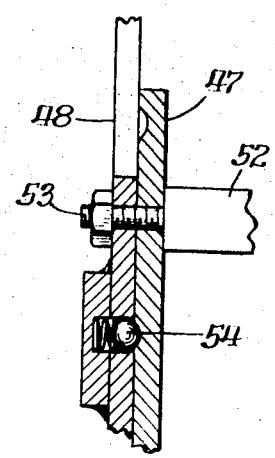
FIG. 4 is an enlarged cross-sectional view of a portion of the structure of FIG. 2 and taken substantially along the line 4—4 of FIG. 2.

The cam follower assembly 29 provides that during the rotation of part 20 by the drive wheel 41, the welding tip of the gun 28 will follow the edge contour of the part 20. The cam follower assembly 29 comprises a detent plate 47, a pivotal arm 48, and cam rollers 49, 50, and 51. The detent plate 47 is secured in a vertical position to extend below the lower edge of assembly 27 by a bracket 52 mounted between the assembly 27 and the plate 47. The bracket 52 may be seen in FIGS. 4 and 6. The roller 50 is carried at the lower end of plate 47 to rotate about a vertical axis. The plate 47 is further positioned relative to the gun 28 and the drive wheel 41 so that the vertical plane through the axis of wheel 41, and including the tip of gun 28, also includes the axis of roller 50. The pivotal arm 48 is pivotally connected substantially at its longitudinal center to the plate 47 by a fastener 53. A detent ball 54, which may be seen in FIG. 4, is mounted in the arm 48 and in cooperation with two detent notches in the plate 47 will lock the arm 48 in either of two pivoted positions, that shown in FIGS. 1 and 2 or that shown in FIG. 3. Handles 55 on the arm 48 permit easy manual pivoting of the arm 48. Roller 49 is pivotally mounted on one end of arm 48 and roller 51 is pivotally mounted on the other end thereof so that when either roller is positioned in cooperation with roller 50 the roller will rotate about a vertical axis. As may be seen in FIG. 6, considering a vertical plane through the axis of roller 50 and perpendicular to the axis of wheel 41, the axis of roller 49 lies on one side of that plane and the axis of roller 51 lies on the other side of that plane. This arrangement is shown diagrammatically in FIG. 7 and is effective to produce a force through the driving action of wheel 41 on the part 20 which urges whichever pair of rollers, 50 and 49, or 50 and 51, are in cooperating horizontal alignment, against the vertical side of part 20. Because of this arrangement, the gun 28 will accurately follow the edge contour of the part 20 as the part 20 is rotated by the driving wheel 41 in the direction shown by the arrows.

In FIG. 3 it may be seen that the pivoted position of the arm 48 permits the start of a seam weld at an inside corner of part 20. In FIGS. 1 and 2 it may be seen that the pivoted position of the arm 48 permits the conclusion of a seam weld at an inside corner of part 20 after it has been turned over from the position of FIG. 3 for welding on the other side of part 20.

I claim:

1. An automatic welder comprising a supporting structure, a generally horizontally disposed table journally carried on said supporting structure for free rotation, said freely rotating table adapted to carry a part to be seam welded, said supporting structure having a generally vertically disposed post spaced from said table, parallel linkage arms having their one ends pivotally mounted on horizontally disposed pivot pins on said vertical post, a bracket having the other ends of the parallel linkage arms pivotally mounted thereto on horizontally disposed pivot pins, a welding head joining said bracket with a generally vertically disposed pivot pin, whereby the welding head may have both vertical and horizontal swinging movement, drive means mounted in said welding head and adapted to engage and impart drive to the top of a part to be seam welded, cam means mounted on said welding head and adapted to engage the sides of a part to be seam welded, and a welding nozzle mounted on said welding head, whereby the drive means and the cam means cooperate to hold the welding head to a part to be welded which is rotated thus exposing to the welding nozzle successive portions of a part to be welded.

2. In a welding machine, a table for carrying a part to be seam welded, means mounting said table for free rotation in a horizontal plane, a welding head having a welding gun carried thereon, means carrying said head above said table for free movement in limited horizontal and vertical directions, means in said head for imparting rotational drive to the upper horizontal surface of a part to be seam welded when said part is carried on said table and said head is positioned to rest on said upper horizontal surface of said part, cam means carried on said head to depend therefrom in contact with the upper vertical side edge portion of said part, and said cam means arranged to cooperate with said means in said head for imparting rotational drive to produce a horizontal force on said head to urge said cam means in contact with said upper vertical side edge portion of said part to thereby cause said welding gun to follow the contour of said upper vertical side edge portion of said part as said part is rotationally driven by said means for imparting rotational drive.

3. In a welding machine as defined in claim 2, wherein said means in said head for imparting rotational drive to the upper horizontal surface of said part comprises a driving wheel rotatively carried in said head for rotation about a horizontal axis, a portion of said wheel extending below said head and resting on said upper horizontal surface of said part to substantially support said head on said part and in frictional contact with said part, and means in said head for rotating said driving wheel.

4. In a welding machine as defined in claim 3, wherein said cam means comprises a pair of cam rollers mounted on said head to depend therefrom in rolling contact with said upper vertical side edge portion of said part, and said pair of cam rollers further mounted relative to the axis of said driving wheel to produce a horizontal component force from the rotational driving force of said wheel on said part in a direction tending to urge said cam rollers in rolling contact with said upper vertical side edge portion of said part.

5. In a welding machine as defined in claim 4, wherein said welding gun is mounted on said head so that the lower tip of said welding gun is positioned substantially in a vertical plane including the axis of said driving wheel.

6. In a welding machine as defined in claim 5, wherein one of said pair of cam rollers is mounted on said head so that the axis of rotation of said one roller is positioned substantially in said vertical plane including the axis of said driving wheel.

7. In a welding machine as defined in claim 6, wherein the other of said pair of cam rollers is mounted on said head so that a plane including the axes of said pair of cam rollers is disposed at an acute angle to a plane including the periphery of said driving wheel with the apex of said angle generally directed in the direction said part is rotated by said driving wheel.

8. In a welding machine as defined in claim 6, an arm, means carrying said arm substantially centrally thereof for pivotal movement on said head, said other of said pair of cam rollers being rotatively mounted on one end of said arm, a third cam roller, means rotatively mounting said third cam roller on the other end of said arm, detent means mounted on said arm and said means carrying said arm for holding said arm in alternative pivoted positions, said other of said pair of cam rollers positioned on said arm so that when said arm is in one of said alternative pivoted positions said other cam roller is positioned in general horizontal alignment with said one cam roller and so that a plane including the axes of said pair of cam rollers is disposed at an acute angle to a plane including the periphery of said driving wheel with the apex of said angle generally directed in the direction said part is rotated by said driving wheel, said third cam roller positioned on said arm so that when said arm is in the other of said alternative pivoted positions said third cam roller is positioned in general horizontal alignment with said one cam roller and so that a plane including the axes of said one cam roller and said third cam roller is disposed at an acute angle to a plane including the periphery of said driving wheel with the apex of said acute angle generally directed in the direction said part is rotated by said driving wheel.

9. In a welding machine as defined in claim 8, wherein said means carrying said head above said table for free movement in limited horizontal and vertical directions comprises, a vertical fixed column, a sleeve rotatably carried on said column, a hinge member mounted on said head for pivotal movement about a vertical axis, and linkage arms pivotally connected as a parallelogram between said sleeve and said hinge member.

* * * * *